UNITED STATES PATENT OFFICE.

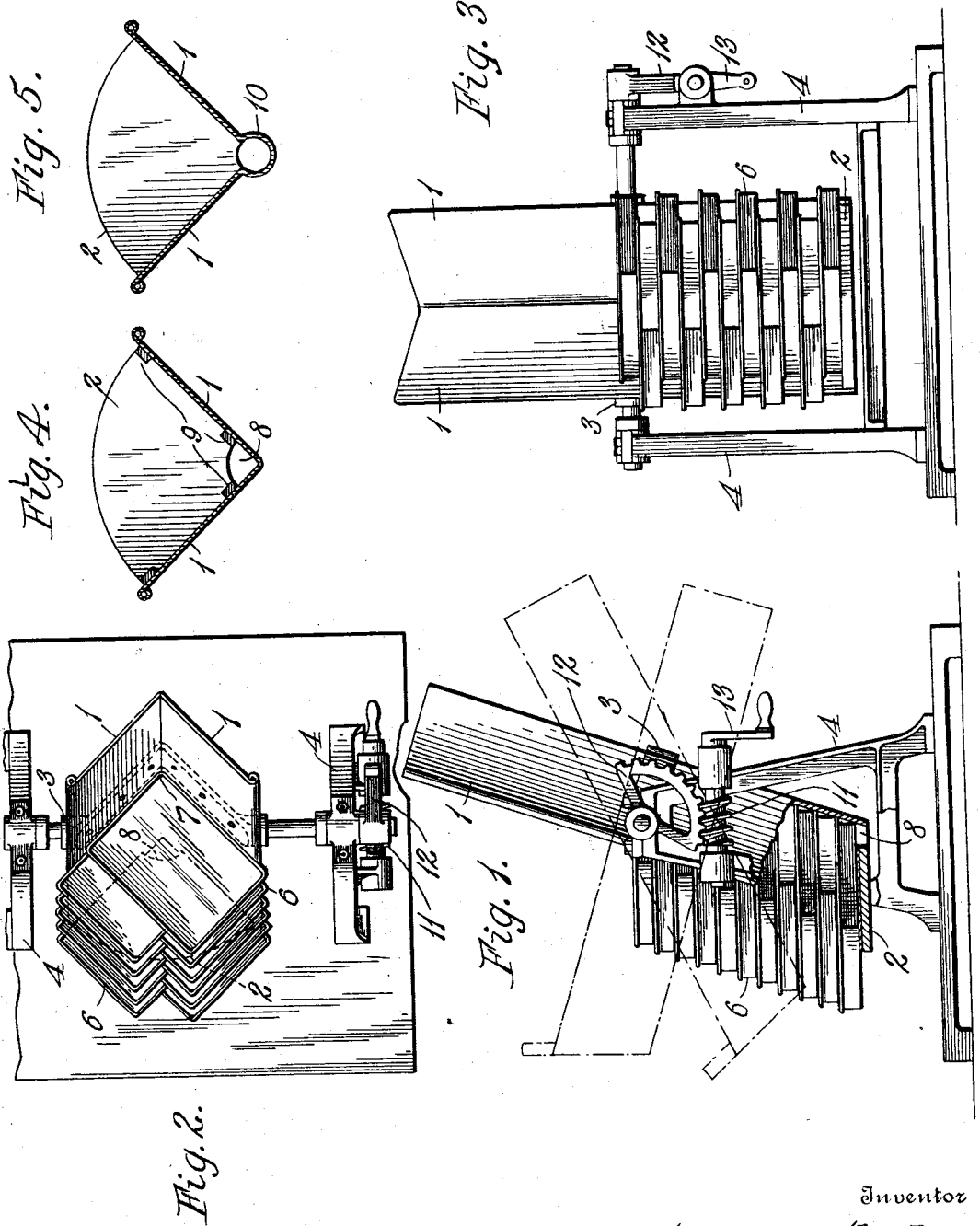

HENRY C. KLOCK, OF DETROIT, MICHIGAN.

DRAINING APPARATUS.

1,069,147.

Specification of Letters Patent. Patented Aug. 5, 1913.

Application filed November 4, 1912. Serial No. 729,225.

*To all whom it may concern:*

Be it known that I, HENRY C. KLOCK, a citizen of the United States of America, residing at Detroit, in the county of Wayne and State of Michigan, have invented certain new and useful Improvements in Draining Apparatus, of which the following is a specification, reference being had therein to the accompanying drawings.

In the manufacture of certain kinds of confectionery the molded fondant, fruit or other material that forms the basis of the confections is placed in trays or pans and syrup is then poured in, in any sufficient quantity to completely cover the fondant or the like. This syrup is in condition for crystallization and after it has stood a certain amount of time, sufficient to give the required depth of coating to the confection, the pans or trays are slightly uptilted to allow the surplus to drain off partially. As this is accomplished and the confections hardened, the trays are tilted to a greater extent and finally are placed in such position that the entire residual syrup runs out of the pans. This necessitates the individual handling of each pan or tray and in addition to this requires great skill on the part of the operator to prevent any sudden jar or shock which causes the syrup to suddenly "grain" without properly crystallizing. The process is therefore not only difficult and uncertain but consumes considerable time and requires high priced labor.

This invention relates to an apparatus whereby a number of trays or pans may be filled with sufficient syrup to cover the contents of the trays, and then arranged in a stack and allowed to stand the required time, the stack being gradually turned in such manner as to allow the slow draining away of the syrup and finally the complete removal thereof, the whole being accomplished without any liability of such jarring or agitating of the trays as to cause the syrup to grain, the apparatus being so arranged that it does not require particular skill on the part of the operator.

The invention consists in the matters hereinafter set forth and more particularly pointed out in the appended claims.

In the drawings, Figure 1 is a view, partially in section and partially in elevation, of an apparatus that embodies the invention; Fig. 2 is a plan view of the apparatus; Fig. 3 is a view in front elevation; and Figs. 4 and 5 are views in transverse section through a draining rack showing slight modifications of the latter.

Referring to the drawings, a draining rack having inclined sides 1 and an end wall 2 slightly oblique to the side walls, is mounted between its ends on a cradle 3 that is journaled in horizontal position in suitable frames or standards 4. The rack, which is of sheet metal or other suitable material, is arranged to receive a stack of trays 6 that rest on the end wall 2 when the rack is uptilted, and are so disposed as to leave a slight drainage space between the inner corners 7 of the pans and the angle of the rack, the end wall 2 being cut away to form an opening 8. Special provision for drainage may be made by having ribs 9 formed up or secured on the inner faces of the walls 1, as indicated in Fig. 4, to keep the trays well away from the walls of the rack, or as indicated in Fig. 5, the rack may have a depression or trough 10 at the angle of its walls. The cradle 3 may be swung in either direction by any preferred means. As herein shown as one desirable means, a worm 11 is journaled on one of the frames 4 to mesh with a segmental gear 12 that is secured to one of the cradle shaft ends, a crank handle 13 being provided for convenient manipulation of the worm.

In operation the rack is turned into the position indicated in Fig. 1 so that a stack of trays placed therein are in substantially horizontal position. Thereafter when the contents of the trays are in proper condition, the rack is turned gradually and readily by movement of the crank a sufficient degree to allow the bulk of the syrup to drain away through the opening in the end wall of the rack. After standing in this position a sufficient time, the rack is turned farther so that the remaining syrup which drains off may flow out through the open end, the trays standing in practically upright position. As a result of this form and mode of operation one person can handle a large number of trays at once in such manner that the syrup has no tendency to grain and the trays are uniformly drained.

The cross section of the rack may, of course, be varied to suit trays of different dimensions and the supporting means for the rack is preferably of sufficient height so that the syrup may be directed into a kettle or like suitable receptacle.

Obviously, changes in the details of construction may be made without departing from the spirit of my invention, and I do not care to limit myself to any particular form or arrangement of parts.

What I claim is:—

1. A draining apparatus comprising a base, a cradle tiltably mounted on the base, a draining rack secured on the cradle having inclined sides forming a trough and a lower end wall that connects the sides and has a drain opening at the angle of the rack and manually operable means for tilting and holding the cradle and rack in any desired inclined position.

2. A draining apparatus comprising a draining rack having a pair of inclined sides forming a trough and an end wall and connecting the sides and having a drain opening at the angle of the rack, a tiltable cradle carrying the rack, a base supporting the cradle, and manually operable means on the base for tilting and holding the cradle and the rack in any desired inclined position.

3. The combination with a plurality of trays adapted to be stacked on each other, of a draining rack having inclined sides conforming substantially to the contour of the trays and an end wall adapted to support the trays in stacked and slightly overlapped relation against the side walls when the rack is in initial position, a cradle supporting the rack, standards in which the cradle is journaled, and manually operable means on the standards for swinging the cradle to tilt the rack and to hold it in any desired inclined position.

In testimony whereof I affix my signature in presence of two witnesses.

HENRY C. KLOCK.

Witnesses:
ANNA M. DORR,
GENEVIEVE E. McGRANN.

---

Copies of this patent may be obtained for five cents each, by addressing the " Commissioner of Patents, Washington, D. C."